United States Patent

[11] 3,602,821

[72] Inventor Lyle Bruce Juroff
Indianapolis, Ind.
[21] Appl. No. 31,101
[22] Filed Apr. 23, 1970
[45] Patented Aug. 31, 1971
[73] Assignee RCA Corporation
Continuation-in-part of application Ser. No. 824,547, May 14, 1969, now abandoned.

[54] NOISE IMMUNE PURE CARRIER DETECTOR CIRCUIT

19 Claims, 2 Drawing Figs.

[52] U.S. Cl. .......... 325/364, 325/392, 325/472, 325/487, 328/165
[51] Int. Cl. .......... H04b 1/10
[50] Field of Search .......... 325/319, 363, 364, 392, 393, 472, 478; 340/15; 328/165; 343/225, 228; 329/101

[56] References Cited

UNITED STATES PATENTS

| | | | |
|---|---|---|---|
| 2,638,543 | 5/1953 | Jensen et al. | 325/478 X |
| 2,900,499 | 8/1959 | Blasbalg | 325/363 X |
| 3,037,170 | 5/1962 | Good et al. | 328/165 X |
| 3,299,358 | 1/1967 | Wood | 325/393 X |

*Primary Examiner*—Benedict V. Safourek
*Attorney*—Eugene M. Whitacre

ABSTRACT: In a remote control system transmitted acoustic control signal waves are received by remotely located apparatus, amplified and detected for control of circuits in the apparatus. A noise detector circuit is provided to determine the presence of amplitude variations in the amplified signals. When amplitude variations are detected, disabling means are actuated to attenuate the energy applied to the desired control signal detector circuits.

INVENTOR
LYLE BRUCE JUROFF
BY David E. [signature]
ATTORNEY

INVENTOR
LYLE BRUCE JUROFF

BY David E. Pitchenik
ATTORNEY

NOISE IMMUNE PURE CARRIER DETECTOR CIRCUIT

This is a continuation-in-part of an application filed May 14, 1969, Ser. No. 824,547, entitled "Noise Immunity Circuit," now abandoned and assigned to RCA Corporation.

The present invention relates to remote control systems, and more particularly to noise immunity circuits adapted to be used in an ultrasonic remote control system for electronic apparatus.

Various types of wireless remote control systems have heretofore been proposed wherein a local transmitter is caused to radiate sound control (acoustic) signal waves having a predetermined frequency for reception by, and control of, remotely located apparatus.

Systems of this type have been commonly used to control the operation of a remotely located radio or television receiver by enabling the listener or viewer to adjust the tuning or volume, etc., without moving to the receiver location. Generally, the acoustic waves are generated at discrete frequencies corresponding in number to the number of functions to be controlled in the apparatus. The generated wave is detected in the apparatus by a remote control pickup device and the resulting electrical signals produced are coupled to the apparatus remote control system.

One problem with remote control systems of this type is that many common household sounds may cause erroneous actuation of remote circuits. Thus, immunity from erroneous actuation due to spurious signals generated, for example, by jingling keys or coins and ringing telephones must be provided. In prior art apparatus, such immunity has been provided by frequency selective filters and time delays associated with mechanical relays. Nevertheless, since spurious signals of this type generally contain frequency components which are close to the desired generated frequencies, and moreover, may persist beyond the time delay afforded, these prior art noise immunity circuits have not satisfactorily eliminated false actuation by spurious signals.

In a remote control apparatus, a system embodying the present invention includes means for providing a signal output in response to remotely generated signals, with control means, coupled to the signal providing means, for controlling the functions of the apparatus. A detector circuit determines the presence of amplitude variations of the output signals from the signal providing means, and a disabling means prevents the control of the apparatus function when amplitude variations in the output signal are detected.

Figure 1:
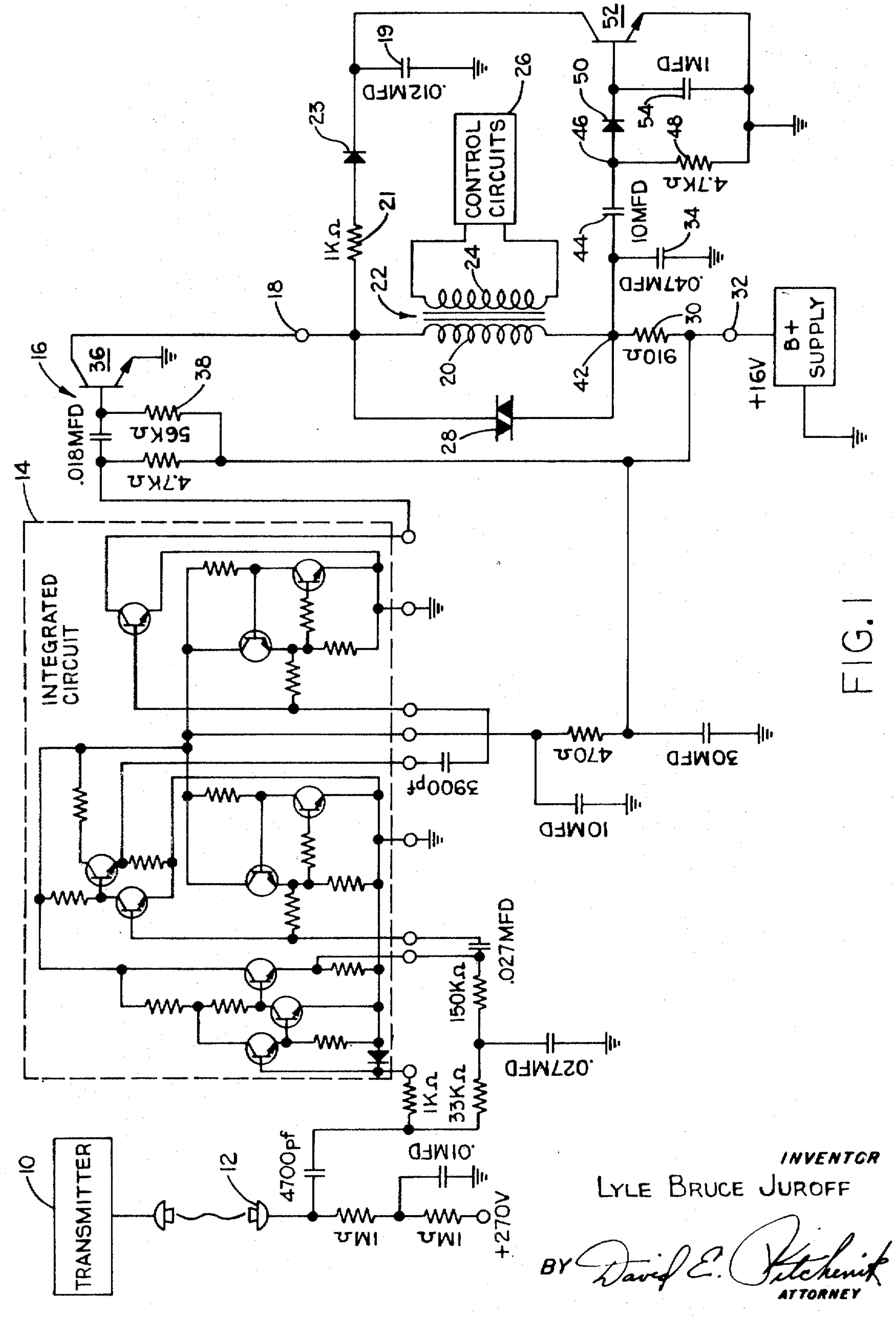
Figure 2:
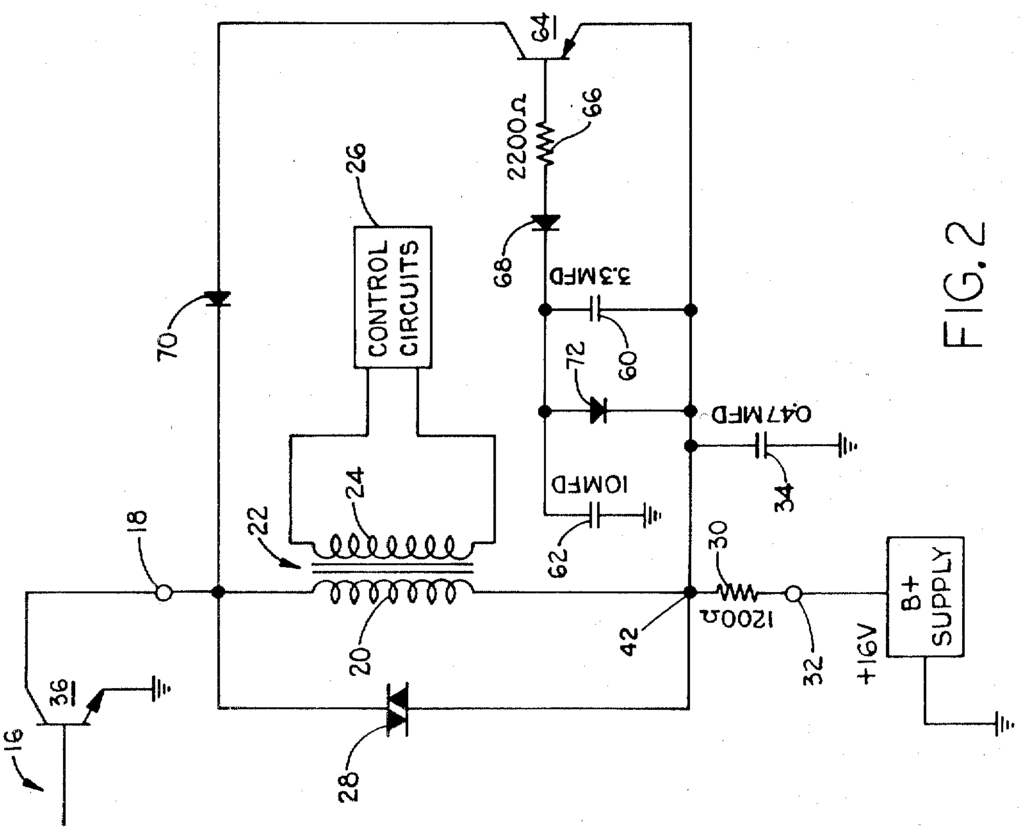

A complete understanding of the present invention may be obtained from the following detailed description of a specific embodiment thereof, when taken in conjunction with the accompanying drawings, in which:

FIG. 1 is a schematic circuit diagram, partly in block form, of a remote control system embodying the present invention; and FIG. 2 is schematic circuit diagram of another remote control system embodying the present invention which provides a further improvement in immunity from erroneous actuation by increased sensitivity to the presence of an amplitude varying spurious signal.

Reference is now made to FIG. 1. A transmitter 10, which may be of the hand-held variety, transmits acoustic or sound control waves. In the present instance, the transmitter may be similar to CRK 10A described in RCA Remote Television Service Data 1968 No. T4 published by RCA Sales Corporation, 600 N. Sherman Drive, Indianapolis, Ind. A transmitter of this type includes a transistor oscillator which is actuated by pressing a button to produce any one of eight different ultrasonic control frequencies as long as the button is depressed. The eight frequencies are in the range of 34 kHz. to 45 kHz. The control signals are transmitted by a sonic transducer and are detected by a microphone 12 associated with an integrated circuit amplifier 14. The particular amplifier employed is not critical to the invention; however, the integrated circuit amplifier 14 shown in the drawing is described in a patent granted to L. A. Harwood, Pat. No. 3,423,725, and entitled, "Remote Control System." Minor changes in the biasing of the integrated circuit amplifier have been made from that shown and described in the Harwood patent because a discrete amplifier stage 16 has been added for increased amplifier system gain. The output stage on the integrated circuit chip in the Harwood application was biased for Class C operation whereas the same stage as shown in FIG. 1 is biased for Class A operation.

The output signals from the amplifier system are developed at a terminal 18 and applied to the primary winding 20 of a transformer 22. The transformer's secondary winding 24 is coupled to the TV signal processing and control circuits 26. A varistor 28 (nonlinear voltage response resistor whose resistance decreases with increasing voltage) is connected across the primary winding 20 to prevent spike voltage from developing across the winding which may cause breakdown of the transistor 36.

The primary winding 20 is connected by a resistor 30 to a terminal 32 which is adapted to be energized by a B+ power source. The resistor is bypassed to a point of fixed reference potential, shown as ground, by a capacitor 34 for signal frequencies. Typical frequencies employed in TV remote control systems of the type described herein range from approximately 34 kHz. to 45 kHz. The B+ power source supplies operating current through the resistor 30 and the winding 20, to the collector-emitter current path of the amplifier transistor 36. The base electrode of the transistor is connected to the terminal 32 by the series connected resistor 38. The circuit components are chosen such that under quiescent conditions, that is, when no transmitted signal is present, the bias for transistor 36 is such that the transistor is saturated.

When a desired ultrasonic control signal is picked up by the microphone 12, the resultant electrical signal is amplifier and applied to the amplifier 16 which is normally in saturation. The negative half cycles of the amplified wave are of sufficient amplitude to cut off the transistor 36, and permit the circuit primarily comprised of the inductance of the primary winding 20 and the capacitance of the voltage dependent resistor 28 to ring. The resonant frequency of the ringing circuit is about 100 kHz.

One positive polarity output pulse is developed across the ringing circuit 20–28 for each cycle of the applied wave. The negative going portions of the ringing signal are attenuated by conduction of the collector-base junction of the transistor 36.

It will be noted that a circuit comprising a resistor 21, diode 23, capacitor 19 and capacitor 34 are connected in series across the primary winding 20. As a result, the first several positive going ringing pulses are attenuated by this low impedance path charging the capacitor 19.

The periodic nonconduction of the transistor 36 by the amplified control signal causes the average current through the resistor 30 to decrease. Thus the voltage at the terminal 42 increases from substantially ground potential to a positive voltage. The rate of increase of this voltage is determined by the time constant of the resistor 30 and the capacitor 34. This transient increase in voltage at the terminal 42 is applied via capacitor 44 as a single positive pulse to the diode 50. The diode 50 conducts to charge the capacitor 54 in a positive polarity direction. When the capacitor 54 is charged positively enough the transistor 52 becomes conductive, discharges capacitor 19 and shunts the positive going ringing pulses to ground. When the positive going transient at terminal 42 becomes less steep, the diode 50 becomes nonconductive. The remaining charge on capacitor 54 discharges through the base-emitter path of transistor 52 after which transistor 52 becomes nonconductive.

Following the time that the transistor 52 becomes nonconductive, the ringing pulses across the primary winding 20 are attenuated by the circuit including the diode 23 until the capacitor 19 is charged.

The operation just described takes about 100 milliseconds after which substantially unattenuated ringing pulses are developed across the primary and secondary windings 20 and 24 for application to the control circuits 26. It will be noted that increases in the average conduction of the transistor 36 do not affect the conduction of transistor 52. However, decreases in the average conduction of the transistor 36 of sufficient rate of change will be detected and cause the transistor 52 to conduct and attenuate the ringing pulses developed across primary winding 20. The resistor 21 provides sufficient isolation to prevent the voltage at terminal 42 from being seriously affected by conduction of transistor 52.

It has been recognized that spurious signals such as jingling keys, clinking coins, ringing telephones contain frequency components within the passband of the remote control system. As described in the Harwood patent supra, substantial immunity to such spurious signals is provided by the remote control amplifier system. However, since these spurious signals often contain strong components close to the frequency of a desired control signal, spurious actuation of the control circuits may occur. Since the spurious signals may be characterized as containing other frequencies as well as the ones close to the desired control channel, the nonlinear interaction of the various components of the spurious signals produce beat frequency components of lower frequency. As a result, the repetition rate at which the transistor 36 is turned off is modulated by these lower frequency beat frequencies. The time constant of the network including the resistor 30 and capacitor 34 is arranged to develop signals in the range of 20 Hz. to 10 kHz. which are then detected by the circuit including the diode 50 and used to turn on the transistor 52. When the transistor 52 is turned on, ringing pulses developed across the primary winding 20 are attenuated to prevent the spurious signals from falsely actuating the control circuits 26.

Reference is now made to FIG. 2 which is a noise immunity circuit providing increased sensitivity to the presence of amplitude variations in the output signal from the amplifier system which are developed at terminal 18. Like components in the two FIGURES are designated by similar reference numerals. This circuit is suitable for operation with the transmitter, microphone and amplifier systems of FIG. 1 and are not shown. Although the noise immunity circuit of the remote control system shown in FIG. 1 operates quite satisfactorily, nevertheless, immunity from erroneous actuation of the control circuit is provided by attenuating the spurious signals detected as being present in the output of the amplifier system. The attenuation reduces the level of the spurious signals and renders detection of the amplitude variations more difficult. The sensitivity of the noise immunity circuit to the presence of the amplitude varying spurious signals. The circuit shown in FIG. 2, on the other hand, does not attenuate the spurious signals but merely prevents these signals, when detected, from being coupled by transformer 22 into the control circuits 26. Thus, a substantial increase in sensitivity to spurious signals is provided because the circuits for preventing the actuation of the control circuits, when amplitude variations in the output of the amplifier system are detected, do not attenuate the spurious signals.

Output signals from the amplifier system are developed at the terminal 18 and applied to primary winding 20 of the transformer 22. The transformer's secondary winding 24 is coupled to the TV signal processing and control circuits 26. A varistor 28 is connected across the primary winding 20 to prevent spike voltages from developing across the winding which may cause breakdown of the transistor 36.

The primary winding 20 is connected by the resistor 30 to a terminal 32 which is adapted to be energized by a source of operating potential. The resistor 30 is bypassed for signal frequencies (approximately 34 to 45 kHz.) by a capacitor 34. The operating potential applied to the terminal 32 causes a current to flow through the resistor 30 and the primary winding 20, through the collector-emitter current path of the amplifier transistor 36, when conductive, to ground. Similar to the circuit shown in FIG. 1, the transistor 36 is biased such that the transistor collector-emitter current path is saturated during quiescent conditions.

Under quiescent conditions, when transistor 36 is saturated, the junction 42 is substantially at ground potential. As a result, the capacitors 60 and 62 connected in series between junction 42 and ground, as well as the capacitor 34, are discharged. Transistor 64 whose emitter-base junction is coupled across capacitor 60 by the resistor 66 and diode 68 is biased to be nonconductive and provide a relatively high impedance between its emitter and collector electrodes.

When a desired ultrasonic control signal is picked up and amplified to thereafter be applied to the base electrode of the transistor 36, the negative half cycles of the amplified signal are of sufficient amplitude to cutoff the transistor 36, and to permit the circuit primarily comprised of the inductance of the primary winding 20 and the capacitance of voltage dependent resistor 28 to ring. The resonant frequency of the ringing circuit is about 100 kHz.

The positive polarity pulses developed across the ringing circuit 20–28 are decoupled or blocked from forward biasing the collector-base junction of the transistor 64 by a diode 70. This prevents normal signals from being distorted by the conduction of the collector-base junction of the transistor 64. The signals are coupled via the secondary winding 24 into the control circuits 26. The periodic nonconduction of the transistor 36 causes the average current through the resistor 30 to decrease. Thus, the voltage at the terminal 42 increases from substantially ground potential to a positive voltage. The rate of increase of this voltage is determined primarily by the time constant of the resistor 30 and the capacitor 34.

The increase in voltage at the terminal 42 causes the series connected capacitors 60 and 62 to become charged by a current flow from junction 42 through the capacitors to ground. The charge on the capacitor 60, however, bleeds off due to the current path comprised of the emitter-base junction of the transistor 64, the resistor 66 and diode 68. After approximately 200 milliseconds, a condition obtains wherein the capacitor 62 is charged and the capacitor 60 is discharged.

As previously indicated, spurious signals of the type which often erroneously actuate the control circuits, generally contain other frequencies as well as the ones close to the desired control channel. The nonlinear interaction of the various components of the spurious signals produce beat frequency components of lower frequency, and as a result, the repetition rate at which the transistor 36 is turned off is modulated by the lower frequency beats.

The time constant of the network including the resistor 30 and the capacitor 34 is arranged to develop a signal in the range of 20 Hz. to 10 kHz. which signal voltage variations, when present, are detected by the circuit including the diodes 68 and 72 and the capacitors 60 and 62 to be used to turn on the transistor 64.

The positive going portions of the signal amplitude variations at the junction 42 cause a charge to be added to the series connected capacitors 60 and 62. During the negative portion of the amplitude variations, charge is removed from capacitor 62 via the diode 72; however, no charge is removed from the capacitor 60. As a result, the voltage differential across the capacitor 60 biases the transistor 64 into conduction. The impedance (primarily resistor 66) associated with the current path in parallel with the capacitor 60 is sufficient to provide a time constant such that the transistor 64 remains conductive during the negative going portions of the signal amplitude variations occurring at the junction 42.

Conduction of the collector-emitter current path of a transistor 64 provides a low impedance current path from the junction 42 to the terminal 18 which is in parallel with the higher impedance primary winding 20 of the transformer 22. As a result, during conduction of the transistor 36, substantially no current flows into the primary winding 20, and, consequently, when transistor 36 becomes nonconductive no significant field is present in the primary winding which will collapse and couple energy via the secondary winding 24 into the control circuits 26. It should be noted that the signal voltage output from the transistor 36 is not attenuated and the amplitude varying voltage level at the junction 42, the detection point, is unaffected by the conduction of the transistor 64.

What is claimed is:

1. In a remote controlled apparatus, a system comprising:
means for providing a signal output in response to remotely generated signals;
control means for controlling functions of said apparatus coupled to said signal providing means;
a detector circuit for determining the presence of amplitude variations of the output signals from said signal providing means; and
disabling means, coupled to said detector circuit, for preventing output signals from said signal providing means from being applied to said control means such that the control of said apparatus functions is prevented when amplitude variations of said output signals are detected.

2. A system as defined in claim 1 wherein said disabling means includes a three terminal device having a first and second terminal coupled between said signal providing means and a point of reference potential, and a control terminal for controlling the conductivity of said first-second terminal current path coupled to said detector circuit.

3. A system as defined in claim 2 wherein said detector circuit includes a diode coupled between said signal providing means and said control terminal.

4. A system as defined in claim 3 including frequency dependent impedance means coupled to said diode for preventing high frequency signals from passing through said diode.

5. A system as defined in claim 2 wherein said disabling means includes a capacitor coupled between said first terminal and a point of fixed reference potential.

6. A system as defined in claim 5 wherein said disabling means includes a resistor and a diode connected in series and coupled between said signal providing means and said three terminal device.

7. A system as defined in claim 6 wherein said three terminal device is a transistor.

8. In a remote controlled apparatus, a system comprising:
amplifier means for providing a signal output in response to remotely generated signals;
control means for controlling functions of said apparatus;
a transformer having a primary winding and a secondary winding, said secondary winding coupled to said control means;
a first resistor coupled between one end of said primary winding and a source of operating potential, the other end of said primary winding coupled to said amplifier means;
a control device having a first electrode, a second electrode, and a control electrode, said control device second electrode coupled to a point of reference potential;
a first capacitor coupled between said first electrode and said point of reference potential;
a second resistor and a first diode connected in series and coupled between said one end of said transformer and said first electrode; and
a second diode coupled between said first resistor and said control electrode.

9. A system as defined in claim 8 including a second capacitor coupled between said control electrode and said point of reference potential.

10. A system as defined in claim 9 including a third capacitor coupled between said first resistor and said fixed point of reference potential.

11. In a remote controlled apparatus, a system comprising:
amplifier means for providing a signal output in response to remotely generated signals;
control means for controlling functions of said apparatus;
a transformer having a primary and a secondary winding, said primary winding coupled to said amplifier means and said secondary winding coupled to said control means;
means providing a shunt current path across the primary winding of said transformer, said path including a switching device switchable between high and low impedance conditions; and
a detector circuit for determining the presence of amplitude variation in the signal output from said amplifier means, said detector circuit coupled to said switching device to cause said device to be switched to the low impedance condition when said detector circuit determines the presence of amplitude variations.

12. A system as defined in claim 11 wherein said device is a bipolar transistor having a collector, an emitter and a base electrode, said transistor collector-emitter electrode current path forming a portion of said shunt current path and said transistor base electrode coupled to said detector circuit.

13. A system as defined in claim 12 including a diode connected in series with said transistor collector-emitter electrode current path.

14. A system as defined in claim 13 wherein said detector circuit includes a first and a second diode connected in series and coupled between the base electrode of said transistor and one end of the primary winding of said transformer.

15. A system as defined in claim 14 wherein said detector circuit further includes a first capacitor connected in parallel with said second diode and a second capacitor connected between the junction of said first and said second diodes and a point of fixed reference potential.

16. A system as defined in claim 15 wherein the primary winding of said transformer is coupled to said amplifier means at the winding end remote from said one end.

17. A system as defined in claim 16 including a resistor connected between said one end of the primary winding of said transformer and a source of operating potential for said amplifier means.

18. A system as defined in claim 17, including a capacitor connected between the junction on said resistor and said one end of the primary winding of said transformer and said point of fixed reference potential.

19. A system as defined in claim 18 including a resistor connected in series with the base electrode of said transistor to limit current flow through the base electrode.

UNITED STATES PATENT OFFICE

CERTIFICATE OF CORRECTION

Patent No. 3,602,821 Dated August 31, 1971

Inventor(s) Lyle Bruce Juroff

It is certified that error appears in the above-identified patent and that said Letters Patent are hereby corrected as shown below:

In Column 3, line 48, "The sensitivity" should read -- The attenuation of the spurious signals thereby reduces the sensitivity --.

Signed and sealed this 7th day of March 1972.

(SEAL)
Attest:

EDWARD M.FLETCHER,JR.
Attesting Officer

ROBERT GOTTSCHALK
Commissioner of Patents